(12) United States Patent
Bertino et al.

(10) Patent No.: US 10,849,272 B2
(45) Date of Patent: Dec. 1, 2020

(54) GRAIN HARVESTING IMPLEMENT

(71) Applicant: Indústrias Reunidas Colombo Ltda., Pindorama (BR)

(72) Inventors: Luiz Henrique Bertino, Pindorama (BR); Vagner Nunes Da Silva, Matão (BR)

(73) Assignee: Indústrias Reunidas Colombo Ltda, Pindorama (BR)

( * ) Notice: Subject to any disclaimer, the term of this patent is extended or adjusted under 35 U.S.C. 154(b) by 210 days.

(21) Appl. No.: 16/149,984

(22) Filed: Oct. 2, 2018

(65) Prior Publication Data
US 2020/0100430 A1    Apr. 2, 2020

(51) Int. Cl.
| | |
|---|---|
| *A01D 51/00* | (2006.01) |
| *A01D 75/00* | (2006.01) |
| *A01D 57/20* | (2006.01) |
| *A01B 73/04* | (2006.01) |
| *A01D 69/03* | (2006.01) |
| *B65G 15/30* | (2006.01) |
| *A01D 61/00* | (2006.01) |
| *A01D 29/00* | (2006.01) |

(52) U.S. Cl.
CPC ............ *A01D 51/00* (2013.01); *A01B 73/044* (2013.01); *A01D 57/20* (2013.01); *A01D 61/002* (2013.01); *A01D 69/03* (2013.01); *A01D 75/00* (2013.01); *B65G 15/30* (2013.01); *A01D 29/00* (2013.01)

(58) Field of Classification Search
CPC ....... B65G 15/30; A01B 73/044; A01B 73/02; A01D 51/00; A01D 75/00; A01D 69/03; A01D 57/20; A01D 61/002; A01D 29/00; A01D 41/141
See application file for complete search history.

(56) References Cited

U.S. PATENT DOCUMENTS

| | | | | |
|---|---|---|---|---|
| 4,184,314 | A | * | 1/1980 | Hobbs ................... A01D 29/00 56/10.3 |
| 4,257,486 | A | * | 3/1981 | Hobbs ................... A01D 29/00 171/101 |
| 4,934,985 | A | * | 6/1990 | Strubbe ................ A01D 41/127 460/4 |
| 5,205,114 | A | | 4/1993 | Hobbs |

(Continued)

FOREIGN PATENT DOCUMENTS

BR    1020150158602 A2    11/2016

*Primary Examiner* — Arpad Fabian-Kovacs
(74) *Attorney, Agent, or Firm* — McKee, Voorhees & Sease, PLC

(57) ABSTRACT

An implement intended for harvesting and/or gathering farm produce is used together with a self-propelled agricultural machine, more specifically a grain harvester, in order to provide driving power for its crop processing systems. A top roller (11) is positioned at the rear end of each conveyor belt (1) whereby, internally and concentrically thereto, the supports (9) move in a continuous rotating movement with the slats (10); the conveyor belt (1) has electronics for adjusting the speeds of the machine and the belts, varying electronically between these magnitudes according to the proportionality parameter; in addition to also regulating the height of the conveyor belt (1B) through electronics and a pivoting device (26); the set of conveyor belts (1) may also be articulated into a transportation position.

7 Claims, 16 Drawing Sheets

(56) References Cited

U.S. PATENT DOCUMENTS

| | | | | |
|---|---|---|---|---|
| 5,799,474 | A * | 9/1998 | Ingram | A01D 89/003 56/119 |
| 8,166,739 | B2 * | 5/2012 | Dow | A01B 73/02 56/192 |
| 8,560,182 | B2 * | 10/2013 | Ringwald | A01D 46/08 56/10.2 E |
| 8,601,780 | B2 | 12/2013 | Schmidt et al. | |
| 9,775,294 | B2 | 10/2017 | Bertino | |
| 9,788,488 | B2 | 10/2017 | Bertino | |
| 2003/0019196 | A1 | 1/2003 | Coers et al. | |
| 2005/0188668 | A1 * | 9/2005 | Geraghty | A01D 42/06 56/344 |
| 2013/0008674 | A1 * | 1/2013 | Kashti | A01D 29/00 171/1 |
| 2015/0272002 | A1 * | 10/2015 | Honey | A01D 34/01 56/153 |
| 2017/0000028 | A1 * | 1/2017 | Bertino | A01D 57/12 |

\* cited by examiner

GRAIN HARVESTING IMPLEMENT

FIELD OF THE INVENTION

This Application for a Patent of Invention refers to an implement intended for harvesting and/or gathering farm produce, which is used with a self-propelled agricultural machine, more specifically a grain harvester, in order to provide driving power for its crop processing systems. Noteworthy among the farm produce that it is designed to process are HARVESTING IMPLEMENT peanuts, beans or any other crop planted in rows that may be harvested from the ground.

STATE OF THE ART

In order to harvest grains, there are self-propelled types of equipment that are coupled to these harvesting platforms, whose function is to bring in the crop. Such items of equipment are described in the following documents: U.S. Pat. No. 9,775,294 B2 (BR 102015015860-2); U.S. Pat. Nos. 5,205,114A; 8,601,780 B2.

Document U.S. Pat. No. 9,775,294 B2 describes, in general lines, a harvesting platform with a mechanical system on a pivot that adapts to the terrain profile, whereby it adjusts independently to each row to be harvested.

Document U.S. Pat. No. 5,205,114A describes a peanut harvester having a header for lifting peanut-laden vines off the ground; an auger for distributing the peanut-laden vines, a series of picking or thrashing cylinders for thrashing the peanut-laden vines and a series of separator cylinders for removing the peanuts from the peanut-laden vines. The separator cylinders include fingers which propel the vines and which rotate at a variable flailing speed. The fingers include tips which vary in angle with respect to the path which the fingers define as they rotate on the separator cylinders Document U.S. Pat. No. 9,788,488 B2 essentially describes a gathering band with slats, rods and toothed wheel chain, whose function is to gather up matter lying in the row and transfer it into the harvesting equipment.

In order to allow the harvesting system to adapt better to the ground conditions with higher productivity, there are control systems as described in document US 2003019196, which allow automatic control of harvesting systems in proportion to the driving speed of the machine. In other words, a harvester speed control system includes a head position sensor connected to a processor. If the platform is lowered while cutting the crop, the speed of the harvester is immediately reduced in order to avoid a sudden increase in the matter downstream from the feeder input point. The percentage of the decrease in speed is preferably and approximately equal to the estimated percentage increase in the matter resulting from the specified change in height, as defined manually by the operator, calculated through a brief calibration process or derived through using an adaptable learning technique. Signals from a production transducer and harvest quality transducers, such as grain loss transducers, are conveyed to the processor in order to define the desired speed of the harvester.

Document U.S. Pat. No. 9,775,294 B2 mentions the existence of much equipment and many machines used to reap, line up, harvest and clean grains, particularly peanuts from diverse origins, such as Brazil, China and North America.

In its Specification, Document U.S. Pat. No. 9,788,488 B2 offers a citation very similar to that in the previous document, mentioning much equipment and many machines used to reap, line up, harvest and clean grains, particularly peanuts from diverse origins, such as Brazil, China and North America.

Document U.S. Pat. No. 8,601,780 B2 mentions an application related to the other documents, particularly US patent documents in the same field of application.

Shortfalls in Documents Constituting the State of the Art

The equipment constituting state of the art is endowed with common characteristics that give rise to known problems, such as transportation difficulties due to platform width for example, which is one of the problems solved by this invention.

In the documents constituting the state of the art, matter harvested by the gathering band may flow back under certain conditions, leading to causing productivity losses that can build up to significant quantities overall.

On the other hand, the ground-tracing mechanical system is extremely heavy, compacting the soil in an effect that is normally unwanted.

Furthermore, using a system working in a constant input speed may waste energy due to a lack of matter; if necessary to increase the harvesting speed, speed and torque may be lacking, which might result in the system choking up due to excessive matter.

In the cases outlined above, operating problems are noted, together with losses and dropping harvest productivity.

As though problems related to harvested material flowback were not enough, soil compacting and the need to increase speed that may lead to choking the system, consideration must also be given to the fact that platform width is a serious transportation problem, as the massive width of the equipment not only causes major difficulties, but may also give rise to accidents, for example.

Along these lines, this invention thus arises as a solution to all the problems listed above, qualifying as a construct that is feasible at the industrial stage.

Purposes of the Invention

The purpose of the invention is thus to propose a practical item of equipment that is very easy to operate and transport, with resources that enhance its harvesting performance, through either allowing higher speeds or by lessening losses, with fewer halts resulting from excessive matter.

Nevertheless, this invention is also noteworthy as it features its own pivot technology for the side arms to move into a position that is orthogonal to the operating position, thus reducing its width during transportation and similar operations.

Advantages of the Invention

In addition to the benefits that are obvious through the preceding description, the following advantages of this invention may be highlighted:
  Articulation system for easier maneuvering and transportation, with remote command possible through a hydraulic activator;
  Cleaning system on the upper belt shaft, which may be called an extractor slat, whose function is to avoid a flowback of harvested matter along the gathering band, thus reducing losses;

Independent ground-tracing system by row, which can follow the terrain profile through electronic control with excellent response time for activation, which is also light and compact;

Feeding speed proportional to working speed, with a minimum belt speed differential in order to ensure a steady inflow, avoiding an excessive build-up of matter (that might cause the system to lock) or losses.

The advantages listed above offer a solution to the problems reported for the equipment constituting the state of the art; these advantages are related to improvements of several magnitudes, such as: savings, easy transportation, steady inflow with no build-up of matter, and an independent terrain profiling system by row that allows an accurate ground profile. All this provides financial advantages and higher productivity for the equipment.

General Description of the Invention

According to this invention, the grain HARVESTING IMPLEMENT comprises a grain HARVESTING IMPLEMENT arrayed in a row, for multiple rows. The implement has a gathering height control device and a gathering band speed activation control unit, which are characteristics of the utmost importance for the problems and solutions that have already been addressed.

In its mechanical solution, the implement has the option to harvest at a speed proportional to the driving speed of the equipment, and a minimum gathering speed may also be established.

The invention also offers the possibility of easier transportation, due mainly to a reduction in the width of the implement, through articulation.

DESCRIPTION OF THE DRAWINGS

The invention will be described below in an embodiment, with references made to the appended drawings in order to ensure a better understanding, which show.

DETAILED DESCRIPTION OF THE INVENTION

Figure 1:
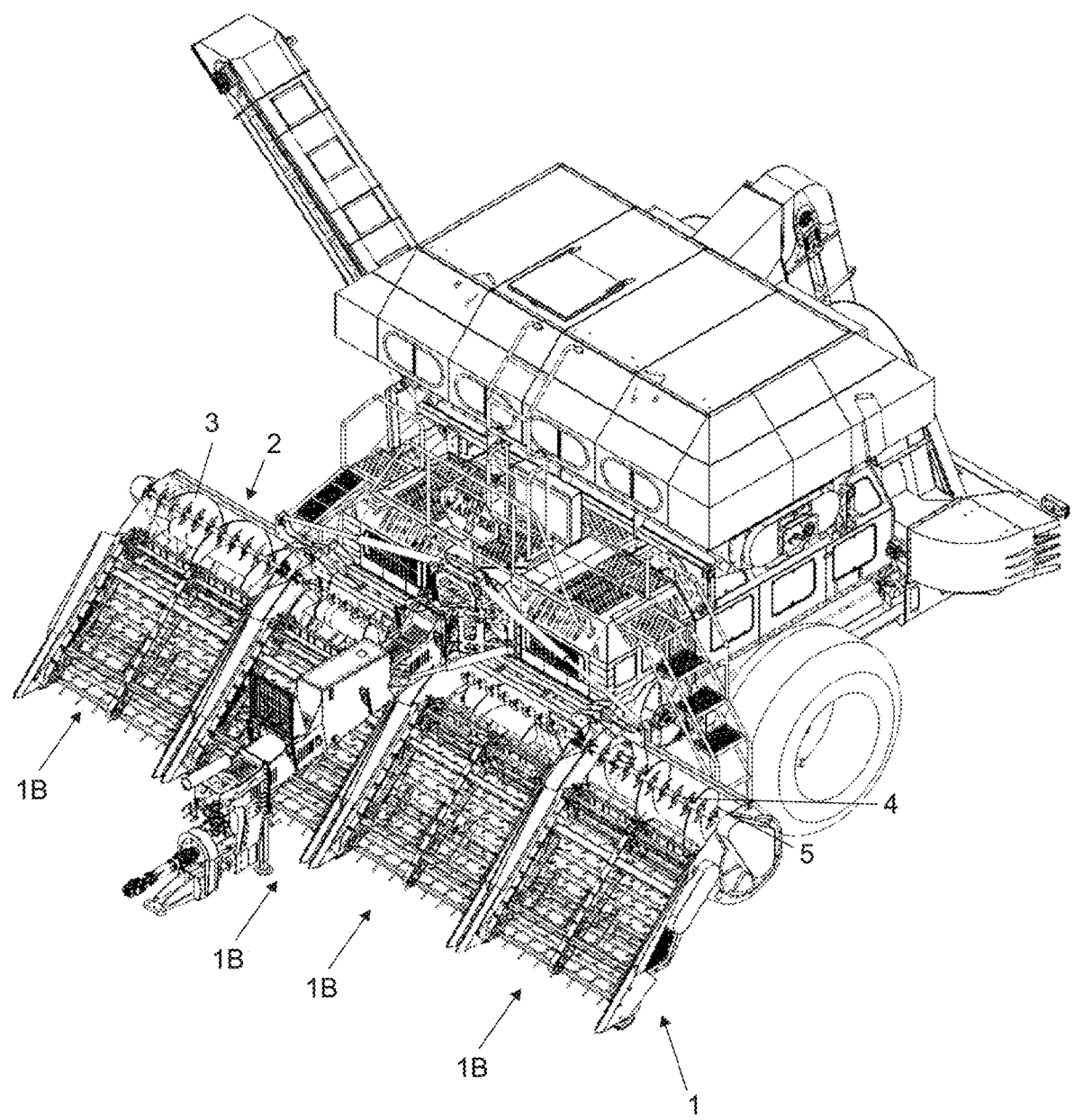
FIG. 1: Perspective view of the grain HARVESTING IMPLEMENT according to the invention, applied in a grain harvester with four gathering belts.
Figure 2:
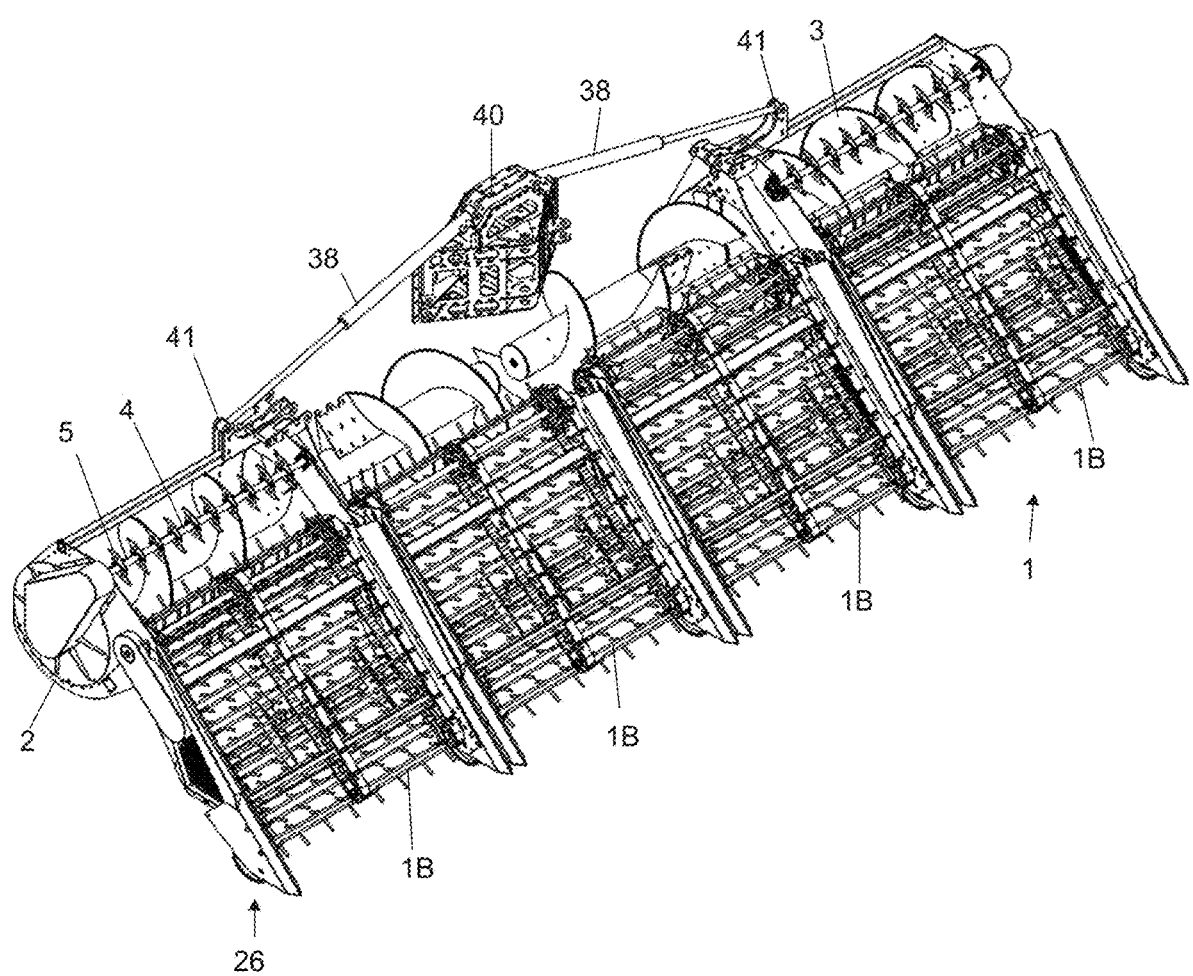
FIG. 2: Perspective view of the implement in a working position.
Figure 3:
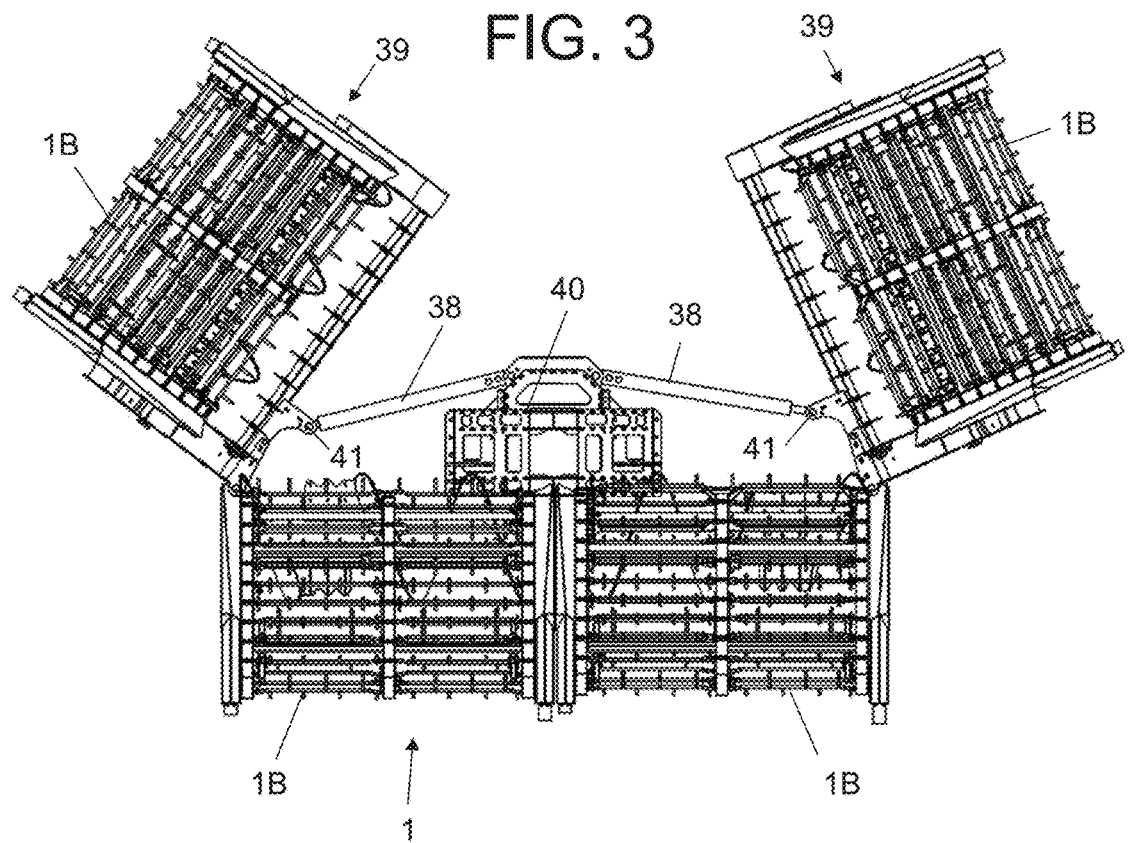
FIG. 3: Front view of the implement in a transportation position.
Figure 4:
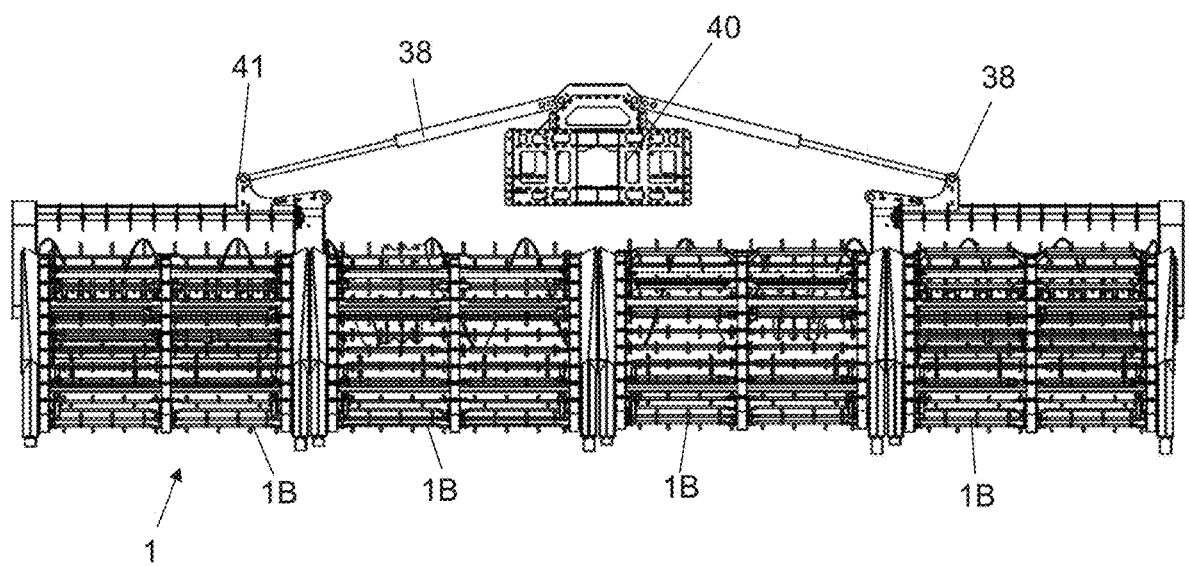
FIG. 4: Front view of the implement in a working position.
Figure 5:
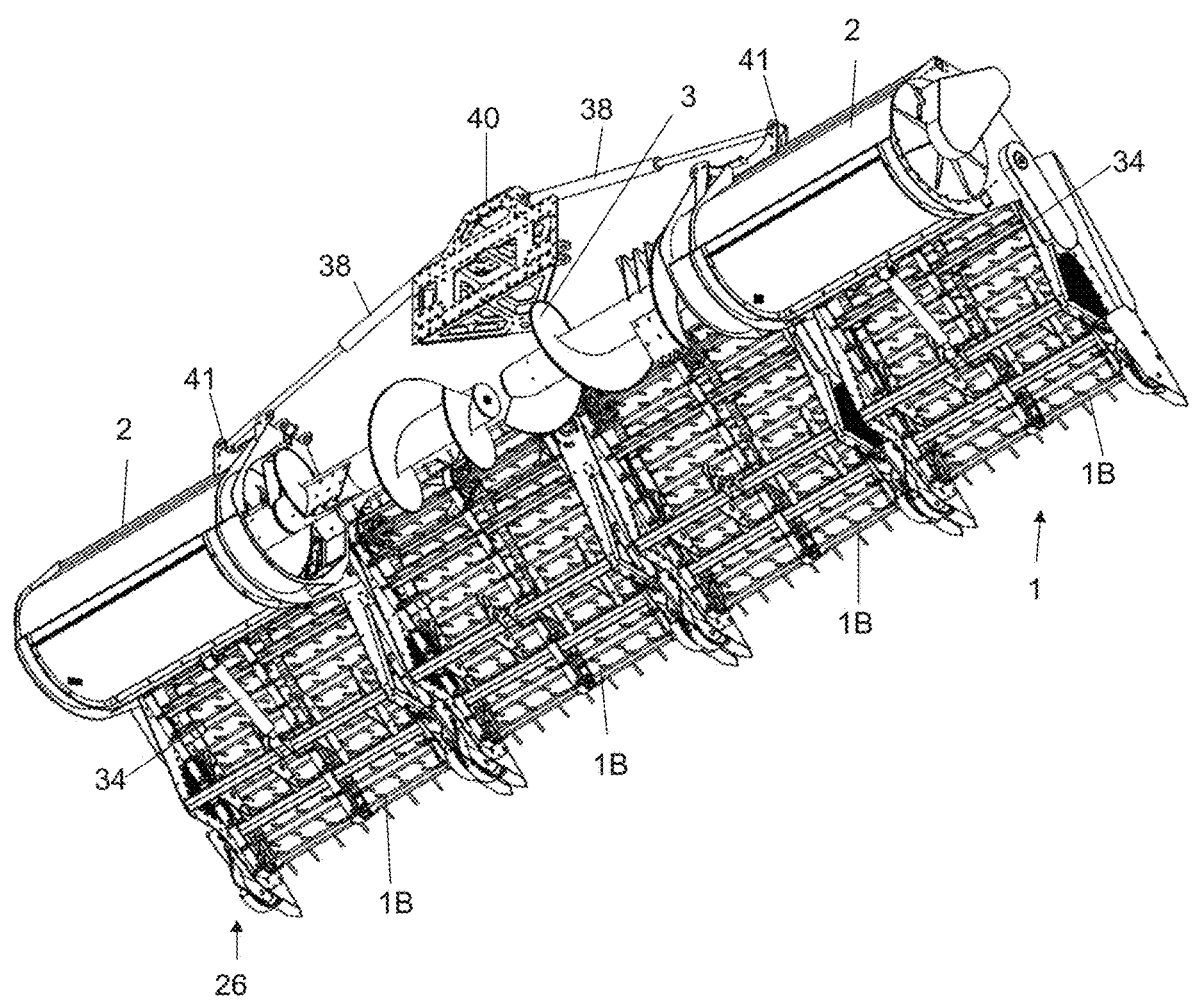
FIG. 5: Perspective view of the implement in a working position, seen from the opposite side of FIG. 2.
Figure 6:
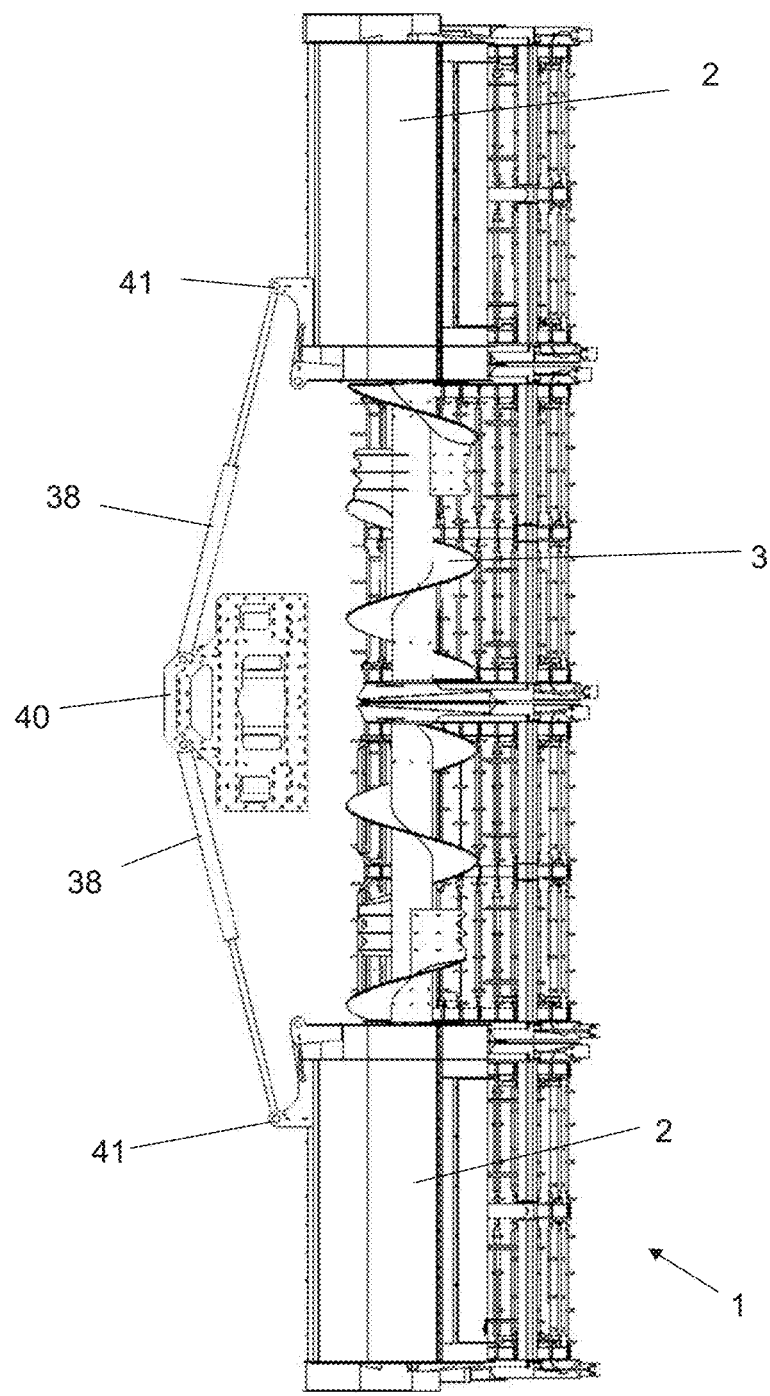
FIG. 6: View of the implement concealing some components in order to illustrate the folding mechanism.
Figure 7:
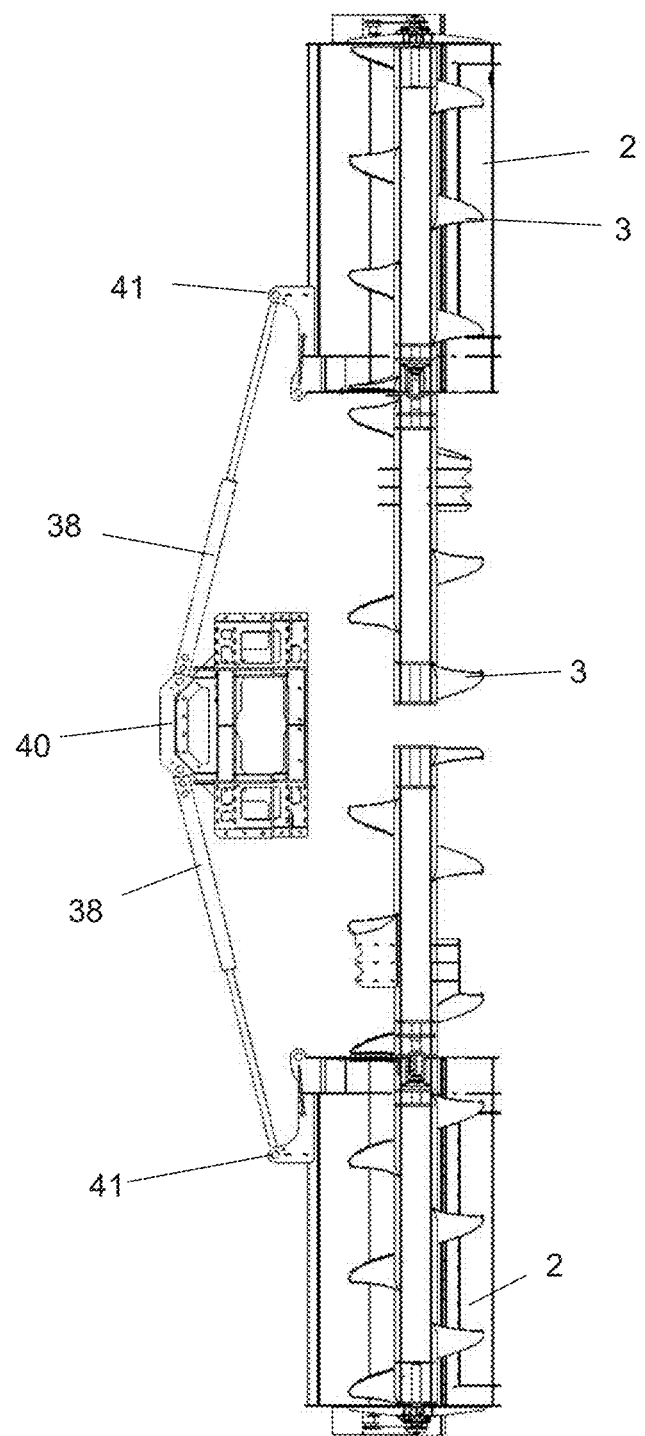
FIG. 7: View of the implement along the same lines as FIG. 6, deliberately concealing some other components.

The GRAIN HARVESTING IMPLEMENT addressed by this Application for a Patent of Invention comprises a farm implement intended for gathering farm produce planted in rows, composed of a set of conveyor belts (1), as shown in FIGS. 1, 2, 4 and 5, that consists of row-independent conveyor belts (1B).

Each independent conveyor belt (1B) is aligned with a semi-cylindrical housing (2) containing a shaft with helicoid (3) and immediately above this, a shaft (4) with sharp-tipped elements (5) that help direct the matter into the machine where it will be processed.

The operating condition of the turning assembly described above is handled through a transmission means (6), an activation device, preferably hydraulic, such as a hydraulic motor, for example. Transmission from the driveshaft to the turning shaft may be handled through a belt, chain or any other mechanical transmission device.

Figure 8:
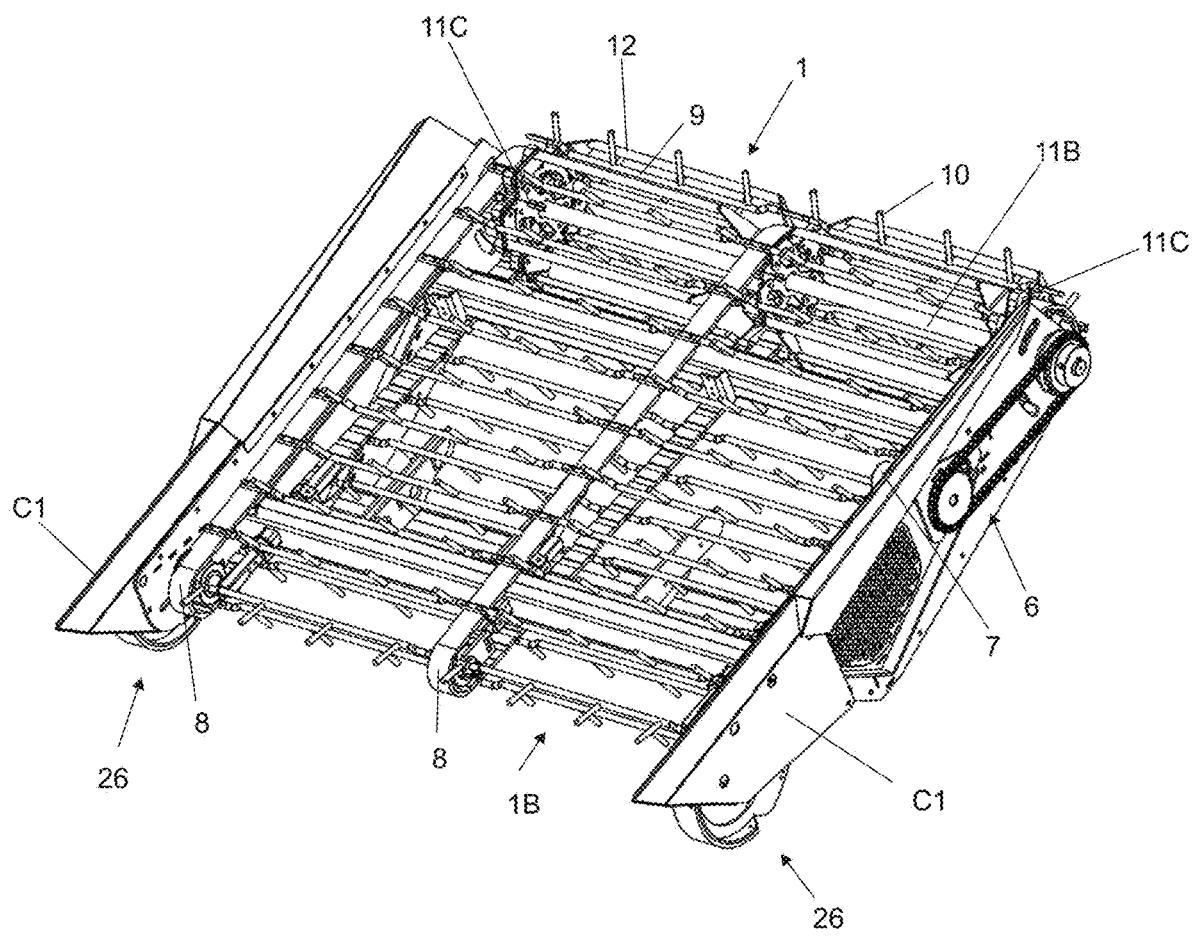
FIG. 8: Perspective view of the conveyor belt, in isolation.
Figure 9:
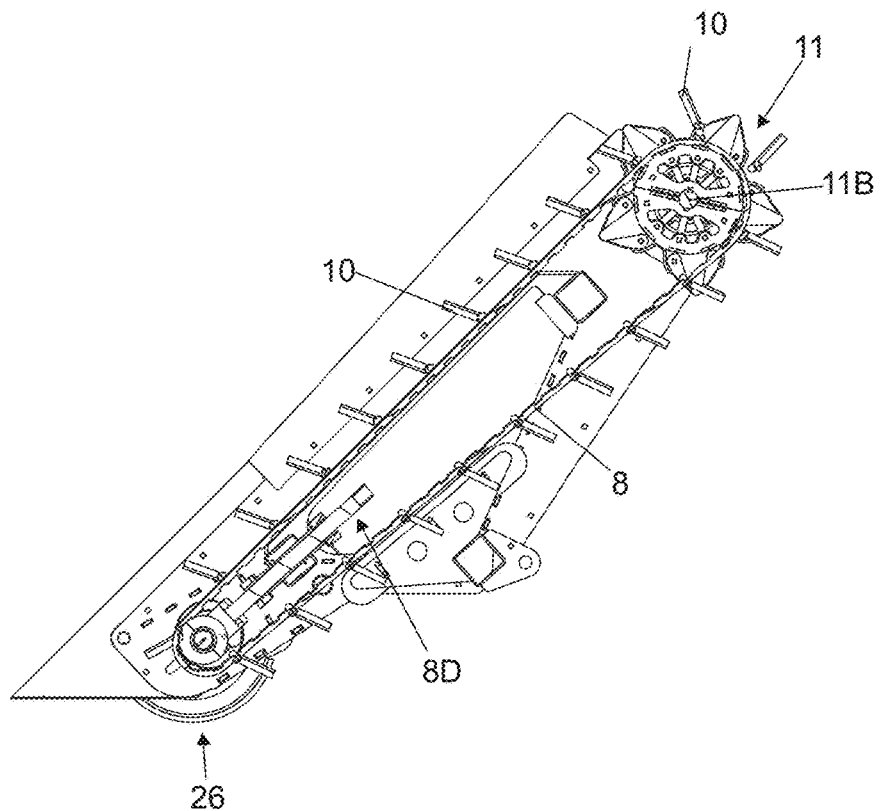
FIG. 9: View of a longitudinal cross-section.
Figure 10:
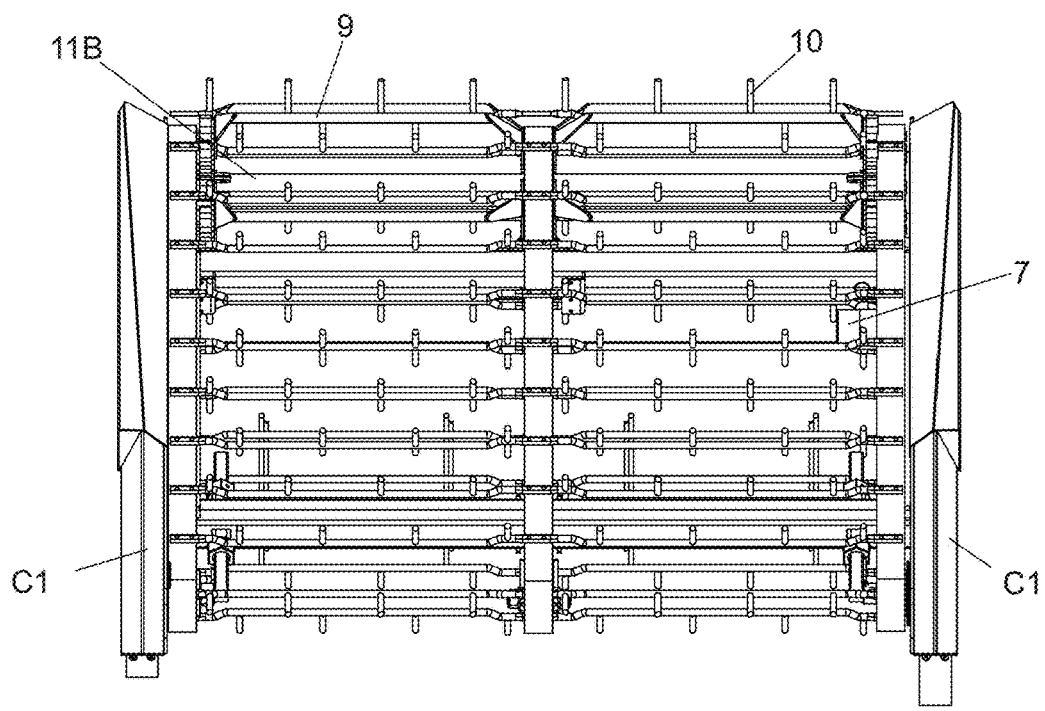
FIG. 10: Front view of the conveyor belt.

According to this text, FIG. 8 shows an individual conveyor belt (1), whereby there is a compact transmission array for each belt that includes a hydraulic motor (7) for driving it.

Each conveyor belt (1) has a traction mechanism for moving the toothed belts (8), which move the supports (9) with matter-dragging slats (10), through traction provided by a hydraulic motor (7). The said toothed belts (8) are coupled at one end to bearings with bushings or similar and at the other end, to a spinning central guide (8B) and spinning side guides (8C), in addition to stretchers (8D) that keep them constantly under traction. Side cowls (C1) ensure that the drive and transmission systems are not exposed along their entire length.

Figure 11:
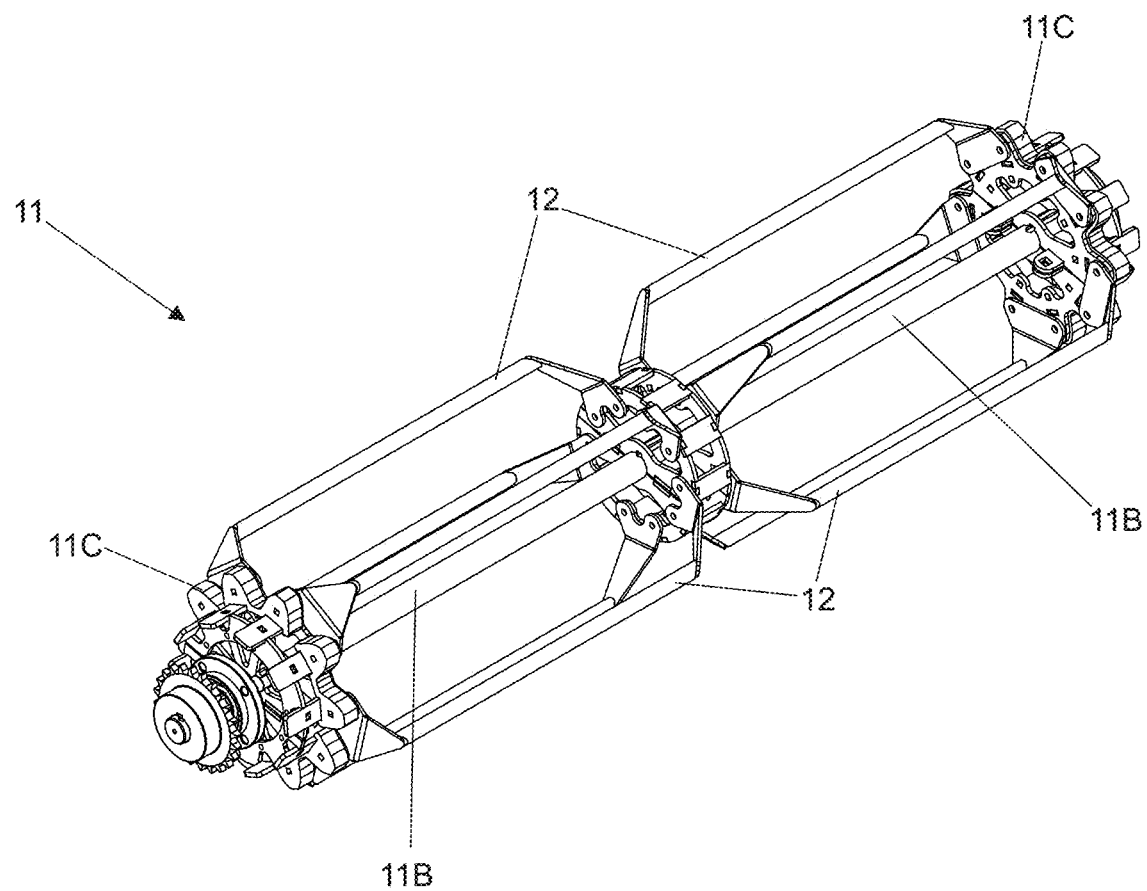
FIG. 11: Perspective view of top roller with extractor slats shown in isolation.
Figure 12:
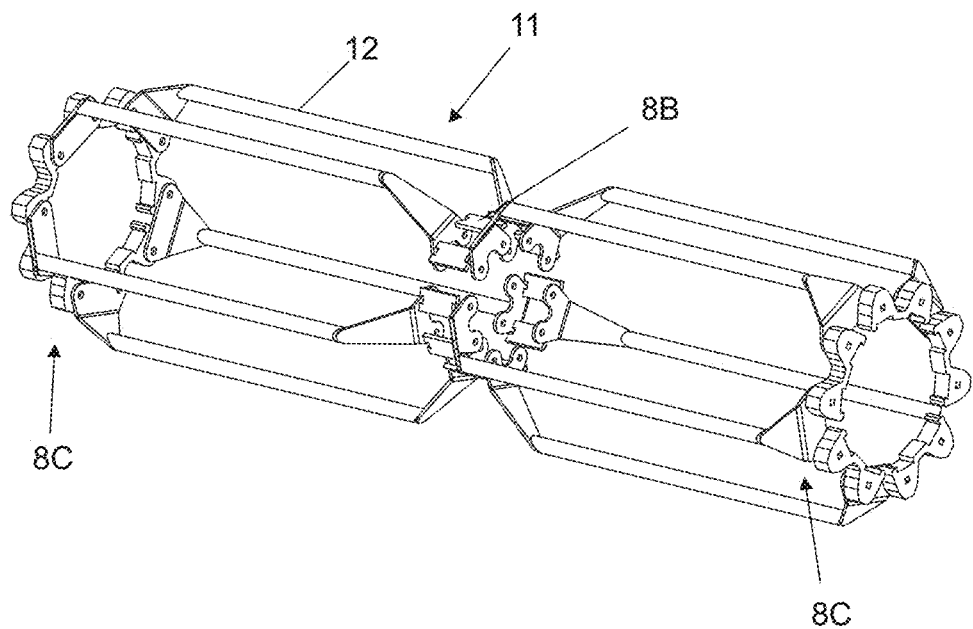
FIG. 12: Perspective view of the extractor slat assembly.
Figure 13:
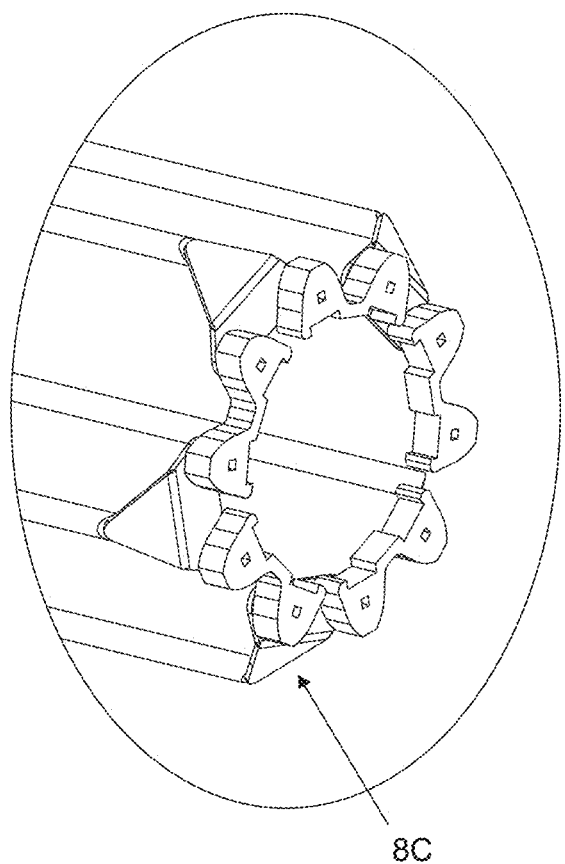
FIG. 13: Expanded perspective view of part of the extractor slat.
Figure 14:
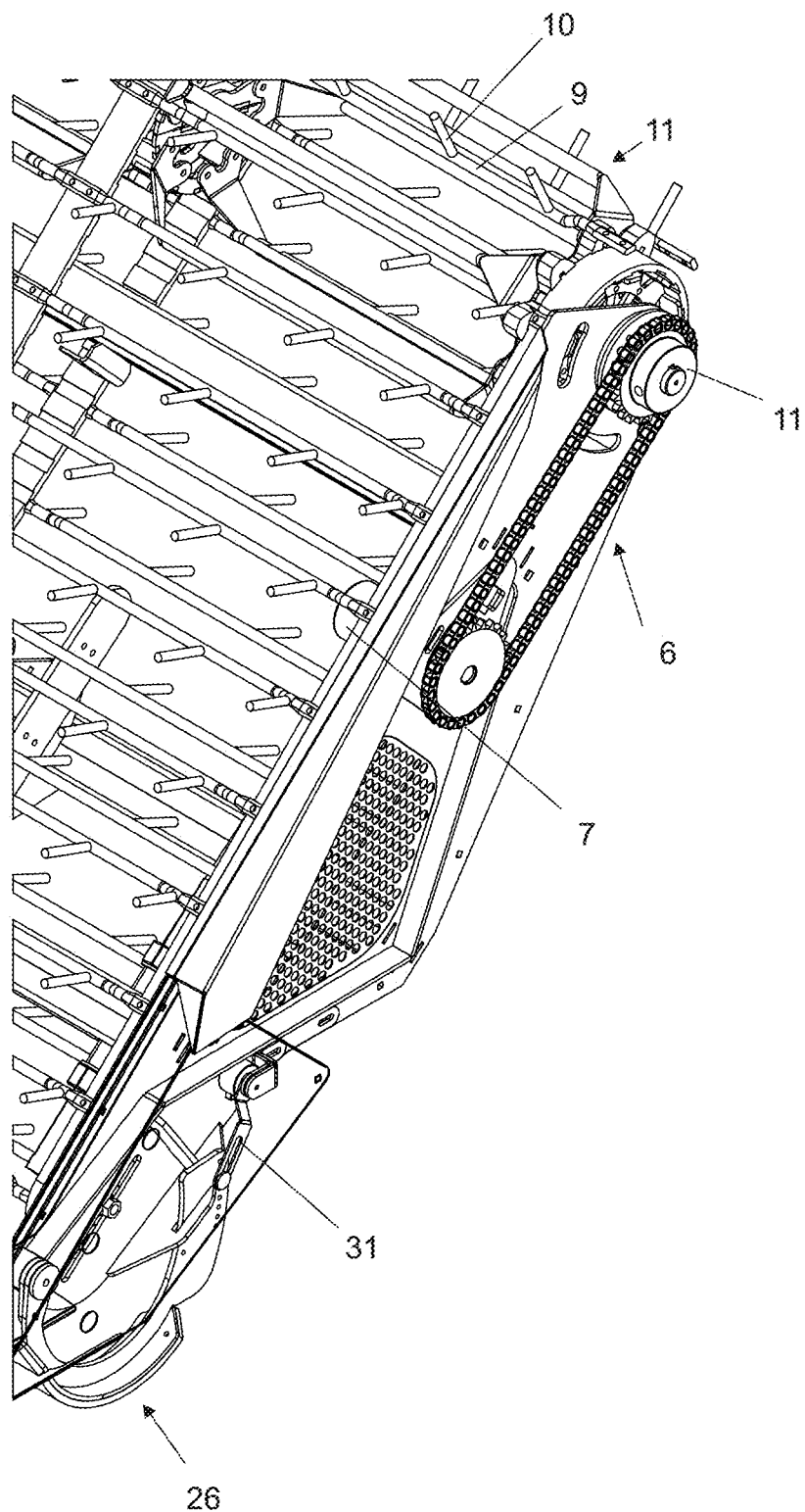
FIG. 14: Partial perspective view of the conveyor belt, particularly the transmission system.
Figure 15:
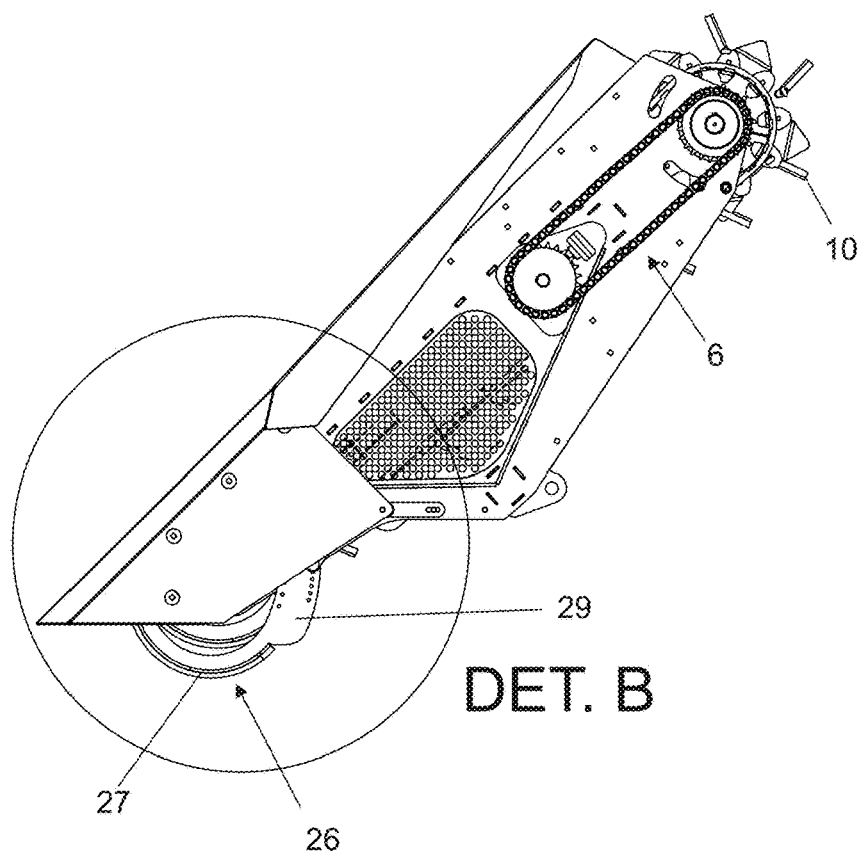
FIG. 15: Partial side view of the conveyor belt-leveling mechanism, with indication of detail "B"
Figure 16:
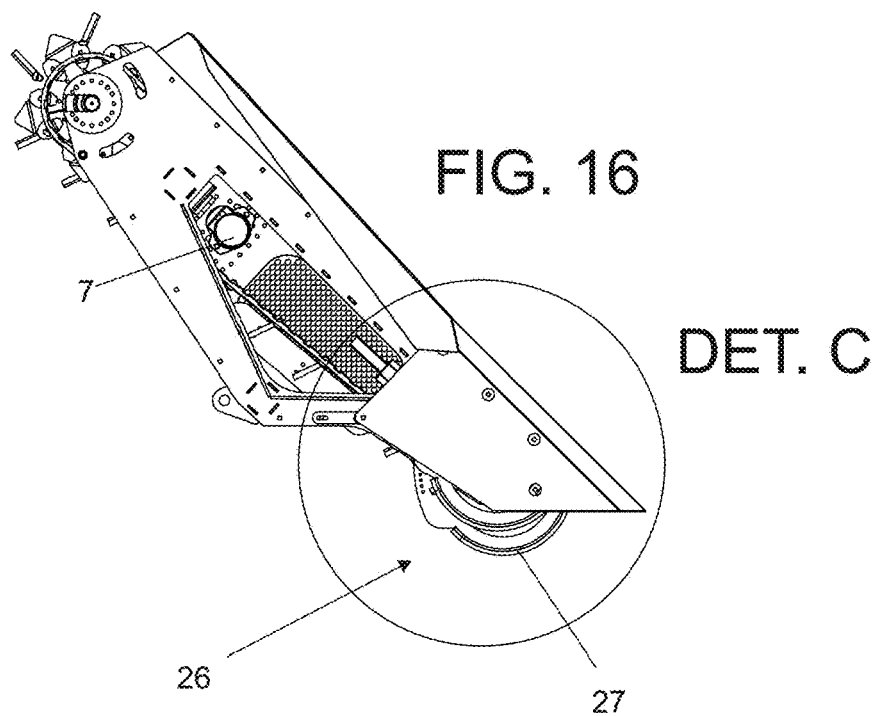
FIG. 16: Partial side view of the conveyor belt-leveling mechanism, with an indication of detail "C"
Figure 17:
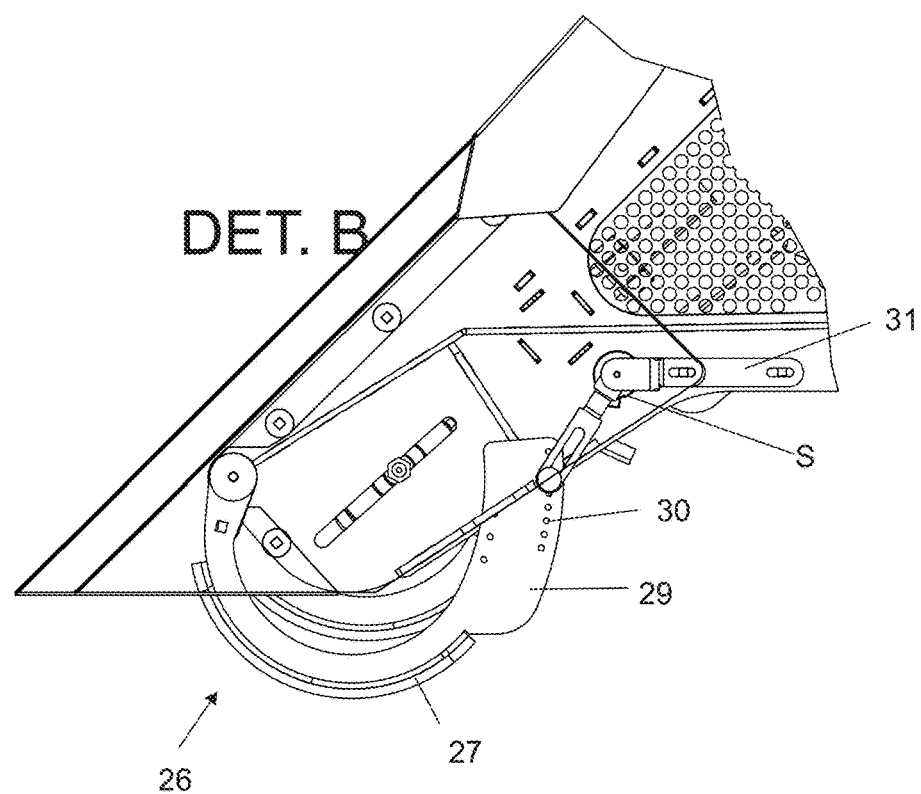
FIG. 17: Partial side view of the conveyor belt-leveling mechanism, according to expanded detail "B", omitting elements of the cowling, with the leveling device in a more lowered position.
Figure 18:
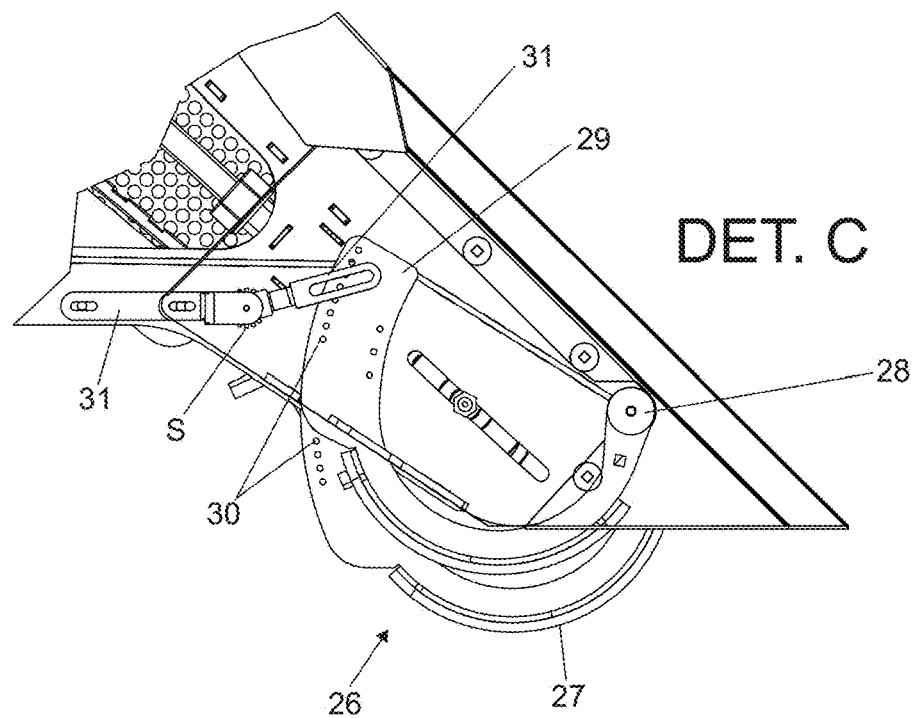
FIG. 18: Partial side view of the conveyor belt-leveling mechanism, according to expanded detail "C", omitting elements of the cowling, with the leveling device in a more raised position.
Figure 19:
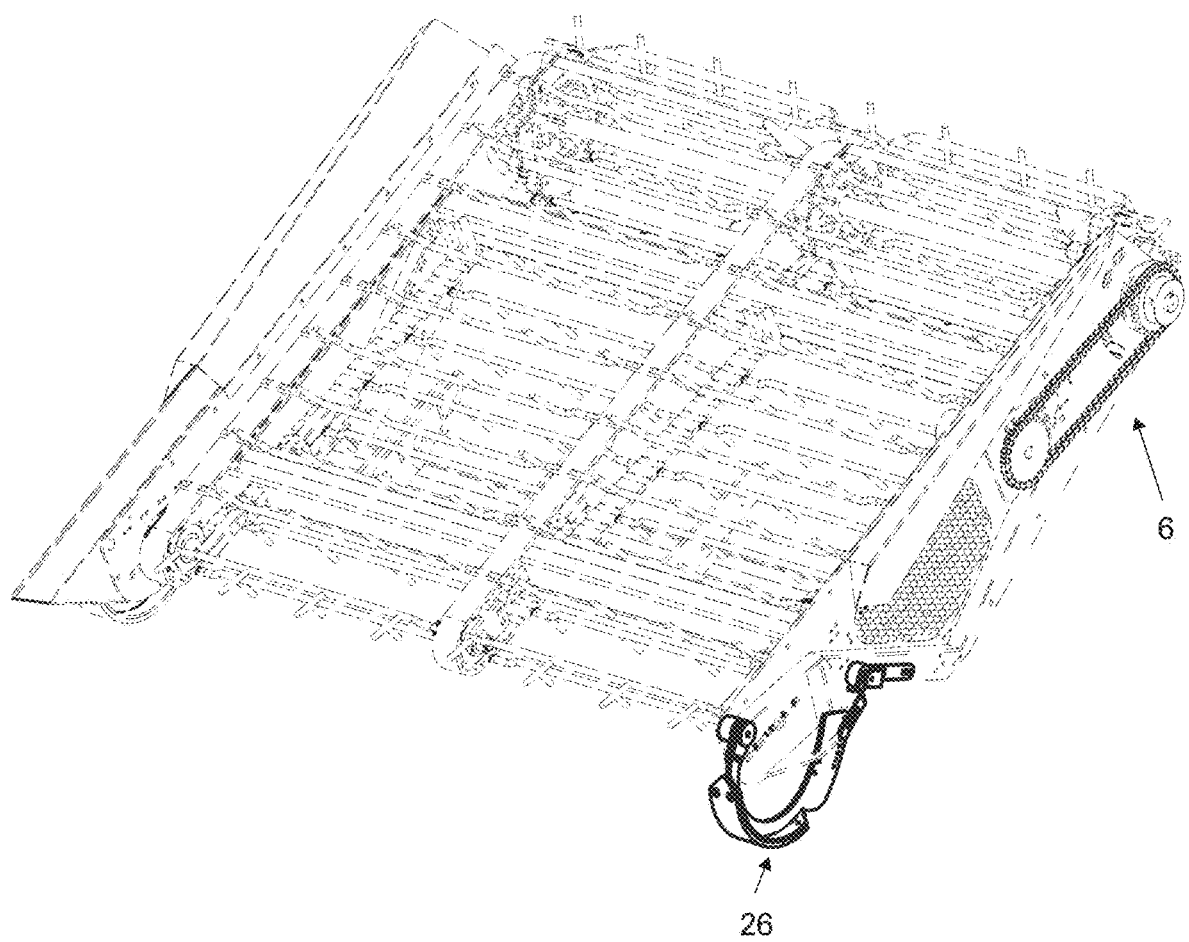
FIG. 19: Shows the belt-leveling device attached to the harvesting platform.
Figure 20:
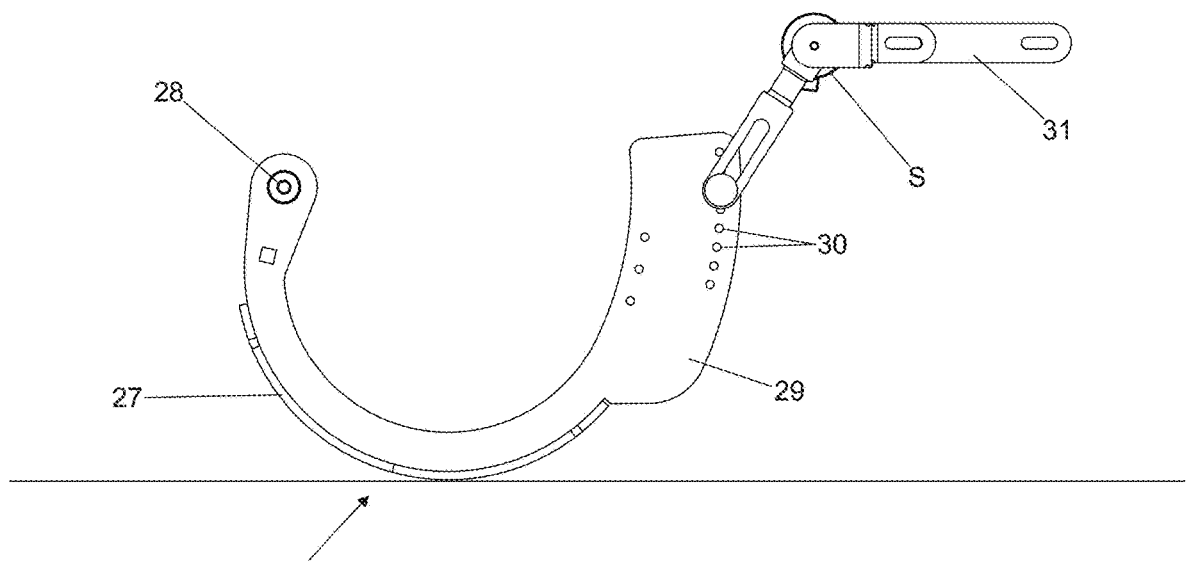
FIG. 20: Shows the leveling device at ground level, with the arm articulated to a lower position, together with the sensor.
Figure 21:
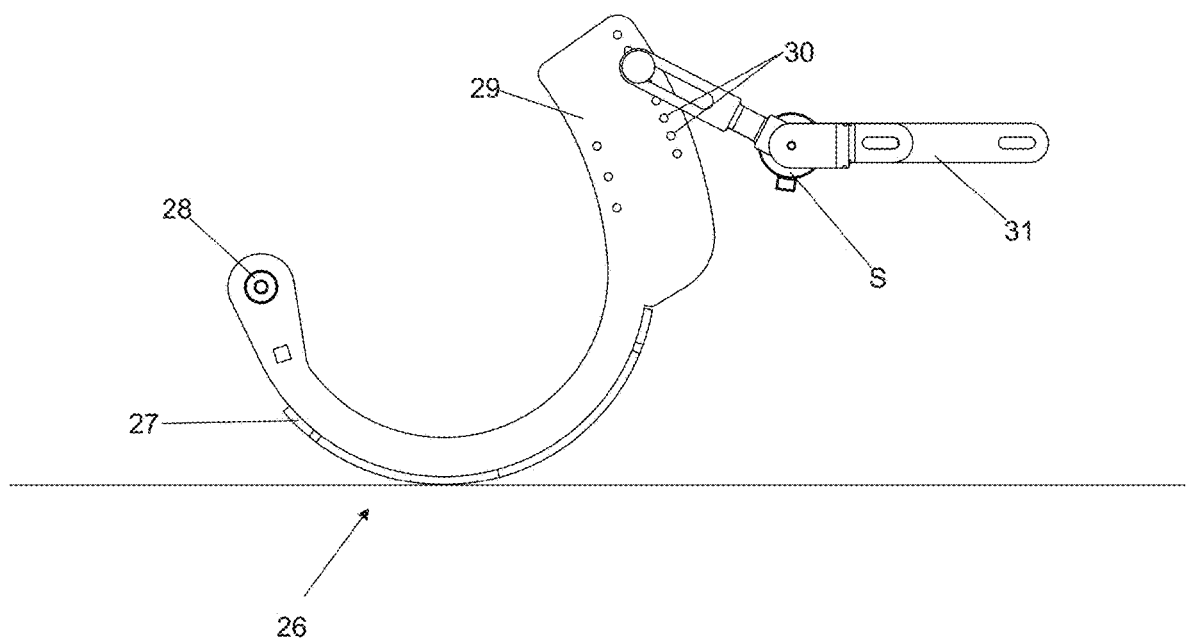
FIG. 21: Shows the leveling device at ground level, with the arm articulated to a higher position, together with the sensor.

At the rear end of each conveyor belt (1) is a top roller (11), as shown in FIG. 11. The top roller (11) is composed of a steel profile structure (12) that defines a cylindrical space whereby, internally and concentrically thereto, the supports (9) move in a continuous rotating movement with the slats (10). The top roller (11) is turned by the shaft (11B), being supported at the ends (11C).

Hence, matter is collected from the ground on the upper part of the conveyor belt (1) through its backward movement. This matter is transferred from the conveyor belt (1)

to the said helicoid (3) which brings the rows together in the center of the platform and sends them to the processing equipment.

The transfer of matter from the conveyor belt (1) to the helicoid (3) is facilitated through the use of the top roller (11) with rods arrayed thereon, whose function is to prevent the matter from getting tangled in the slats (10) of the conveyor belt (1) and flowing back, leading to grain losses, as shown in FIG. 8.

Provision is made for controlling the conveyor belt (1) motor rotation comprised of sensor means that measure rotation and hydraulic valves that control motor speed. This rotation control is proportional to the driving speed of the equipment to which it is attached. Thus, as the driving speed increases or decreases, belt rotation increases or decreases in the same proportion. This is possible by measuring the speed of the machine and the speed of the conveyor belt (1), electronically varying the proportionality parameter between these magnitudes. Through this electronic control, a minimum conveyor belt (1) rotation value is defined for this system whereby, even if the equipment driving speed is zero, the conveyor belt (1) continues to move, ensuring an easier start to gathering and lowering the possibilities of the system locking up you to access matter or the lack of torque for starting to move.

Figure 22:
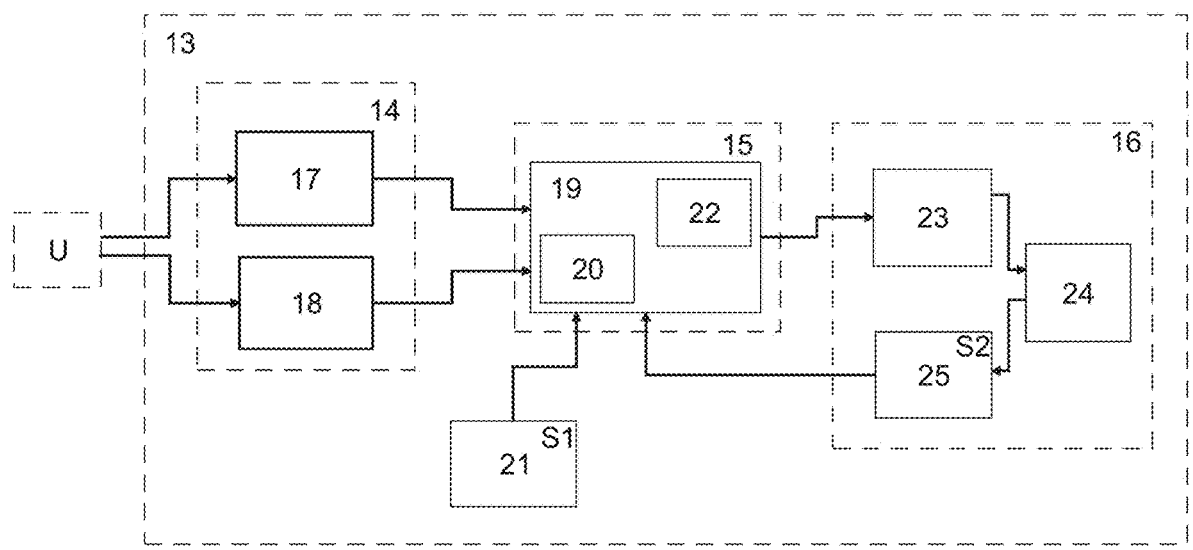
FIG. 22: View of the speed control diagram.

The block diagram in FIG. 22 shows the belt speed control in synchrony with the equipment speed, where the module (13) represents the vehicle wherein is positioned a monitor (14), an electronic module (15) and a belt module (16); the user (U) is connected to the vehicle speed monitor (14) (Setup 1) (17) and belt rotation (Setup 1) (18).

The vehicle speed (Setup 1) (17) and belt rotation (Setup 1) (18) modules are connected to the control logic (19) of the electronic module (15) wherein there is a belt rotation block (Setup 2) (20), that is connected to the actual speed sensor (S1) of the vehicle (21); also in the electronic module (15) there is a minimum belt rotation block (22), that communicates with the electro-hydraulic valve (23) on the belt module (16), with the said electro-hydraulic valve (23) communicating with the hydraulic motor (24) connected to the actual belt rotation (25) sensor (S2), which in turn communicates with the electronic module (15).

According to the diagram in FIG. 22, some steps are followed for controlling speed:
1) The user (U) inputs the values:
   Vehicle speed (Setup 1) (17);
   Belt rotation (Setup 2) (18);
2) Values are fed into the module:
   data input by the user: vehicle speed (Setup 1) (17) and belt rotation (Setup 1) (18);
   Measurement of the actual speed of the vehicle ascertained through the sensor (S1) (21);
3) The module checks the minimum belt rotation status:
   a) If the belt rotation (Setup 2) (20)>minimum belt rotation, then:
   The module calculates the belt rotation value (Setup 2) (20);
   Belt rotation (Setup 2) (20)=RPM belt (Setup 1) (18)× (actual speed of the vehicle (2)/Vehicle speed (Setup 1) (17);
   Note: The belt rotation (Setup 2) (20) is a function of the actual speed of the vehicle: belt rotation (Setup 2) (20)=f (actual speed of the vehicle);
   b) If the belt rotation (Setup 2) (20)<minimum belt rotation, then:
   Actual belt rotation=Minimum belt rotation;
   Note: Minimum belt rotation=Constant;

4) Belt rotation comparison (actual×Setup 2):
   If the actual belt rotation=belt rotation (Setup 2) (20), then OK;
   If the actual belt rotation belt rotation (Setup 2) (20), then activate the electro-hydraulic valve until:
   The actual belt rotation=belt rotation (Setup 2) (20).

As shown in FIGS. 15 to 21, the invention encompasses a device (26) for leveling the conveyor belt (1B) comprised of a semi-circular component (27) that comes into contact with the ground, which has one end (28) coupled to the side of the implement, while the other end constitutes a flat terminal that is broader (29) with adjustment holes (30) for the terminal of a double-jointed arm (31), and with this arm (31) receiving the sensor (S) that determines the distance from the ground.

Leveling control may be handled independently for each row, such as through the device (26) that measures the distance between the assembly and the ground and activators. This distance is transformed into an electrical signal through the sensor (S).

Figure 23:
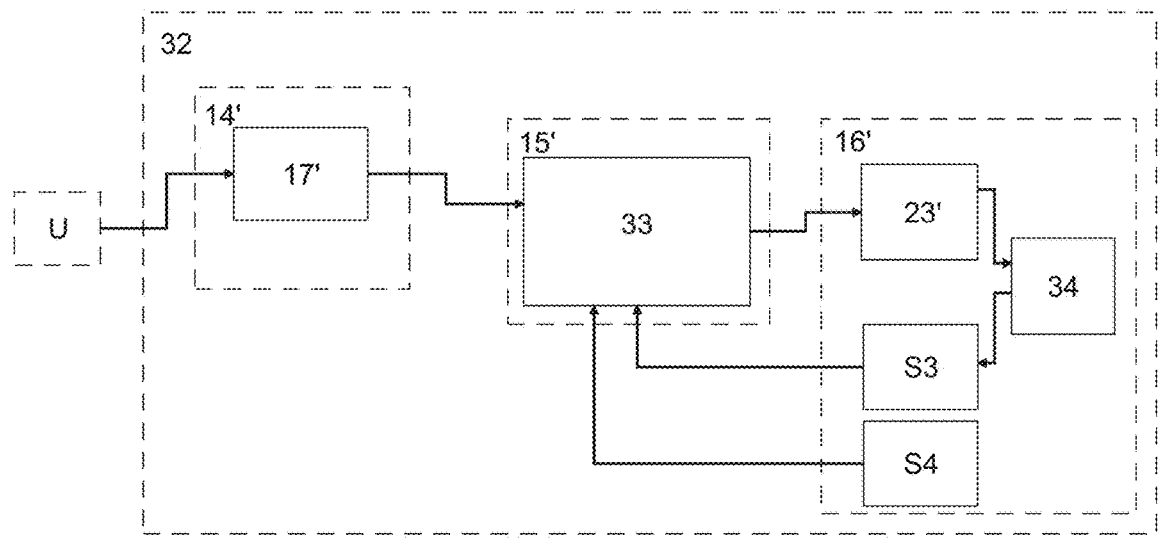
FIG. 23: View of the height control diagram.

FIG. 23 shows the belt height control diagram, where the module (32) represents the vehicle, wherein is positioned a monitor (14'), an electronic module (15') and a belt module (16'); the user (U) is connected to the monitor (14') at belt height (Setup 1) (17'); the electronic module (15') houses a control logic (33) that communicates with the electro-hydraulic valve (23') and the latter with the hydraulic activator (34) and the latter with the actual height left sensor (S3) that, together with the actual height right sensor (S4) communicate with the control logic (33).

According to the diagram in FIG. 23, some steps are followed for height control:
1) The user (U) imports the value:
   Belt height (Setup 1) (17');
2) The values are fed into the module:
   Measurement of the actual left belt height, actual right belt height measured by the sensors (S3) and (S4), respectively;
   Belt height (Setup 1) (17');
3) Module verifies the heights:
   a) If the actual left belt height>actual right belt height, then:
   Activate the electro-hydraulic valve until:
   The actual right belt height=the belt height (Setup 1) (17');
   b) If the actual left belt height<actual right belt height, then:
   Activate the actual left belt=belt height (Setup 1) (17');
   Activate the electro-hydraulic valve until:
   the actual left belt height=the actual right belt height=the belt height (Setup 1) (17');
   c) If the actual left belt height=the actual right belt height, then: the actual left belt height=the actual right belt height=the belt height (Setup 1) (17');
   Activate the electro-hydraulic valve until: the actual right belt height or the actual left belt height=the belt height (Setup 1) (17').

Another differentiating characteristic of this invention is the fact that the cylinders (38) are arrayed on the front part of the implement, whereby the sides (39) may be folded inwards, thus reducing the width of the equipment and offering improved transportation conditions due to greatly-reduced width.

To do so, the invention provides a support (40) in the central part of the equipment where the said cylinders (38) are pivotably connected, projecting diagonally towards the opposite sides, where they meet coupling and pivoting points (41) fitted to the row-independent platforms (1B).

Through hydraulic commands, the cylinders (38) withdraw the said platforms (1B) into the resting or transportation position.

Hence, the grain HARVESTING IMPLEMENT according to this invention, comprises a grain HARVESTING IMPLEMENT lined up in a row, for multiple rows. The implement has a gathering height control device and a gathering band speed activation control unit, which are characteristics of the utmost importance for the problems and solutions that have already been addressed.

Another characteristic of the invention is comprised of the fact that the mechanical solution offered by the implement offers the option of harvesting at a speed proportional to the driving speed of the equipment, in addition to also setting a minimum gathering speed.

Moreover, the feeding speed proportional to the working speed system, with a minimum belt speed differential in order to ensure a steady inflow, avoids excessive build-up of matter (that might cause the system to lock) or losses.

What is claimed is:

1. A grain harvesting implement, comprising a farm implement that gathers farm produce lined up in rows, composed of a set of conveyor belts (1), constituting row-independent conveyor belts (1B); wherein each row-independent conveyor belt (1B) is aligned with a semi-cylindrical housing (2) containing a shaft with a helicoid (3) and immediately above this, a shaft (4) with sharp-tipped elements (5); a turning assembly comprising a hydraulic motor; wherein each conveyor belt (1B) has a traction mechanism for moving toothed belts (8), that operate supports (9) with matter-dragging slats (10), through traction provided by the hydraulic motor (7); wherein a top roller (11) is positioned at the rear end of each conveyor belt (1), whereby, internally and concentrically thereto, the supports (9) move in a continuous rotating movement with the slats (10); the conveyor belt (1) has electronic means for adjusting the speeds of the implement and the belts, varying electronically between these magnitudes according to a proportionality parameter; in addition to also regulating the height of the conveyor belt (1B) through the electronic means and a pivoting device (26), the set of conveyor belts (1) is configured to be articulated into a transportation position; and wherein a leveling device (26) of the conveyor belt (1) is mechanical, in the form of a semicircular component (27) that comes into contact with the ground, which has one end (28) coupled to the side of the implement, while the other end constitutes a flat terminal that is broader (29), with adjustment holes (30) for the terminal of a double-jointed arm (31), with this arm (31) receiving the sensor (S) that determines the distance from the ground.

2. The grain harvesting implement according to claim 1, wherein the top roller (11) is comprised of a metal profile structure (12) that occupies a cylindrical space whereby, internally and concentrically thereto, the supports (9) move in a continuous rotating movement with the slats (10); the top roller (11) is turned by the shaft (11B), being supported at the ends (11C); while the belts (8) are coupled at one end to bearings, bushings and at the other end to a spinning central guide (8B) and spinning side guides (8C), in addition to stretchers (8D).

3. The grain harvesting implement according to claim 1, wherein a belt speed control in synchrony with the equipment speed uses a module (13) of the implement, wherein is positioned a monitor (14), an electronic module (15) and a belt module (16); a user (U) is connected to the monitor (14) and belt rotation (18).

4. The grain harvesting implement according to claim 1, wherein an adjustment means include vehicle speed and belt rotation modules that are connected to a control logic (19) of an electronic module (15), wherein there is a belt rotation block (20), that is connected to an actual speed sensor (S1) of the implement; also in the electronic module (15), there is a minimum belt rotation block (22), that communicates with an electro-hydraulic valve (23) on a belt module (16), with said electro-hydraulic valve (23) communicating with a hydraulic motor (24) connected to an actual belt rotation (25) sensor (S2), which in turn communicates with the electronic module (15).

5. The grain harvesting implement according to claim 1, wherein a height adjustment means include a belt height control module (32) of the implement, wherein is positioned a monitor (14'), an electronic module (15') and a belt module (16'); a user (U) is connected to the monitor (14') at belt height (Setup 1) (17'); the electronic module (15') houses a control logic (33) that communicates with an electro-hydraulic valve (23'), and the latter with a hydraulic activator (34), and the latter with an actual height left sensor (S3) that, together with an actual height right sensor (S4), communicate with the control logic (33).

6. The grain harvesting implement according to claim 1, wherein the set of conveyor belts (1) uses cylinders (38) arrayed on the front part of the implement, pivotably coupled to platforms (1B) whereby sides (39) are configured to be folded inwards, reducing the width of the implement.

7. The grain harvesting implement according to claim 6, wherein there is a support (40) in a central part of the implement where cylinders (38) are pivotably connected, projecting diagonally towards opposite sides, where they meet coupling and pivoting points (41) fitted to the row-independent conveyor belts (1B).

* * * * *